(12) United States Patent
Min et al.

(10) Patent No.: US 9,455,467 B2
(45) Date of Patent: Sep. 27, 2016

(54) DEVICE FOR FOLDING ELECTRODE ASSEMBLY

(75) Inventors: Ki Hong Min, Gwacheon-si (KR); Sung-Min Hwang, Cheongju-si (KR); Jihoon Cho, Daejeon (KR); Changmin Han, Cheongwon-gun (KR); Ki Hun Song, Hwaseong-si (KR); Sang Hyuck Park, Suwon-si (KR); Han Sung Lee, Incheon (KR); Byeong Geun Kim, Anyang-si (KR); Tae-Yoon Jung, Cheongwon-gun (KR); JeongSam Son, Cheongju-si (KR); Su Taek Jung, Jeongeup-si (KR); Hyun Suk Baik, Gumi-si (KR)

(73) Assignee: LG CHEM, LTD., Seoul (KR)

( * ) Notice: Subject to any disclaimer, the term of this patent is extended or adjusted under 35 U.S.C. 154(b) by 170 days.

(21) Appl. No.: 13/809,416

(22) PCT Filed: Jul. 13, 2011

(86) PCT No.: PCT/KR2011/005129
§ 371 (c)(1),
(2), (4) Date: Apr. 29, 2013

(87) PCT Pub. No.: WO2012/008742
PCT Pub. Date: Jan. 19, 2012

(65) Prior Publication Data
US 2013/0209848 A1  Aug. 15, 2013

(30) Foreign Application Priority Data
Jul. 14, 2010  (KR) .......................... 10-2010-0067728

(51) Int. Cl.
*H01M 10/00* (2006.01)
*H01M 10/04* (2006.01)
(Continued)

(52) U.S. Cl.
CPC ..... *H01M 10/0431* (2013.01); *H01M 10/0404* (2013.01); *H01M 10/0459* (2013.01);
(Continued)

(58) Field of Classification Search
CPC .... H01M 4/88; H01M 10/04; H01M 10/058; H01M 10/0431; H01M 10/0404; H01M 10/0459; H01M 10/0583; H01M 10/0525
USPC .................................. 53/430, 429; 29/623.1
See application file for complete search history.

(56) References Cited

U.S. PATENT DOCUMENTS 4,276,683 A   7/1981  Konno et al.
2002/0160257 A1 *  10/2002  Lee et al. ..................... 429/130
(Continued)

FOREIGN PATENT DOCUMENTS

CN   101719561 A   6/2010
JP   6-168736 A   6/1994
(Continued)

OTHER PUBLICATIONS

Machine Translation: CN 101719561.*
(Continued)

*Primary Examiner* — Nicholas P. D'Aniello
*Assistant Examiner* — Stephen Yanchuk
(74) *Attorney, Agent, or Firm* — Birch, Stewart, Kolasch & Birch, LLP

(57) ABSTRACT

Disclosed herein is a folding device to manufacture a stacked/folded type electrode assembly having unit cells sequentially stacked in a state in which a separation film is disposed between the respective unit cells, the folding device including a web supply unit to supply a web having plate-shaped unit cells arranged at a top of a separation film at predetermined intervals, a winding jig to rotate the unit cells while holding a first one of the unit cells of the web so that the unit cells are sequentially stacked in a state in which the separation film is disposed between the respective unit cells, and a rotary shaft compensation unit to compensate for the position of a rotary shaft of the winding jig in an advancing direction of the web (X-axis direction).

7 Claims, 5 Drawing Sheets

(51) Int. Cl.
　　　*H01M 4/88*　　　　(2006.01)
　　　*B65H 59/38*　　　(2006.01)
　　　*B65H 51/20*　　　(2006.01)
　　　*B65H 54/10*　　　(2006.01)
　　　*H01M 10/0525*　　(2010.01)
　　　*H01M 10/0583*　　(2010.01)

(52) U.S. Cl.
　　　CPC .............. *B65H51/20* (2013.01); *B65H 54/10* (2013.01); *B65H 59/38* (2013.01); *H01M 4/88* (2013.01); *H01M 10/0525* (2013.01); *H01M 10/0583* (2013.01); *H01M 2010/0495* (2013.01)

(56) References Cited

U.S. PATENT DOCUMENTS

| 2006/0123622 A1* | 6/2006 | Guy ................................ 29/700 |
| 2007/0184350 A1 | 8/2007 | Kim et al. |
| 2009/0305121 A1 | 12/2009 | Yoon et al. |
| 2013/0260199 A1 | 10/2013 | Min et al. |

FOREIGN PATENT DOCUMENTS

| JP | 7-285717 A | 10/1995 |
| JP | 11-242956 A | 9/1999 |
| JP | 11-283676 A | 10/1999 |
| JP | 2000-12085 A | 1/2000 |
| JP | 2001-057242 A | 2/2001 |
| JP | 2001-243971 A | 9/2001 |
| JP | 2003-146538 A | 5/2003 |
| JP | 2003-523059 A | 7/2003 |
| JP | 2007-317638 A | 12/2007 |
| JP | 2009-505366 A | 2/2009 |
| JP | 2013-531874 A | 8/2013 |
| KR | 10-2001-0082058 A | 8/2001 |
| KR | 10-2001-0082059 A | 8/2001 |
| KR | 10-2001-0082060 A | 8/2001 |
| KR | 10-0859996 B1 | 9/2008 |
| KR | 10-1315130 B1 | 9/2013 |
| WO | WO 2009/005288 A1 | 1/2009 |
| WO | WO 2009/078632 A1 | 6/2009 |

OTHER PUBLICATIONS

International Search Report issued in PCT/KR2011/005129, mailed on Feb. 24, 2012.

* cited by examiner

DEVICE FOR FOLDING ELECTRODE ASSEMBLY

TECHNICAL FIELD

The present invention relates to a folding device to manufacture a stacked/folded type electrode assembly having unit cells sequentially stacked in a state in which a separation film is disposed between the respective unit cells, the folding device including a web supply unit to supply a web having plate-shaped unit cells arranged at a top of a separation film at predetermined intervals, a winding jig to rotate the unit cells while holding a first one of the unit cells of the web so that the unit cells are sequentially stacked in a state in which the separation film is disposed between the respective unit cells, and a rotary shaft compensation unit to compensate for the position of a rotary shaft of the winding jig in an advancing direction of the web (X-axis direction), wherein the rotary shaft compensation unit periodically changes the position of the rotary shaft to compensate for the change in X-axis velocity (Vx) of the web caused during winding of the plate-shaped unit cells, thereby uniformly maintaining tension of the web.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having high energy density and operation potential, long cycle lifespan, and low self discharge rate, which is now commercialized and widely used.

An electrode assembly having a cathode/separator/anode structure, which constitutes a secondary battery, may be generally classified as a jelly-roll (wound) type electrode assembly or a stacked type electrode assembly based on the structure of the electrode assembly. The jelly-roll type electrode assembly is manufactured by coating a metal foil to be used as a current collector with an electrode active material, drying and pressing the coated metal foil, cutting the dried and pressed metal foil into the form of a band having a predetermined width and length, isolating an anode and a cathode from each other using a separator, and helically winding the anode/separator/cathode structure. The jelly-roll type electrode assembly is suitable for a cylindrical battery; however, the jelly-roll type electrode assembly is not suitable for a prismatic battery or a pouch-shaped battery because the electrode active material is separated or space utilization is low. On the other hand, the stacked type electrode assembly is configured to have a structure in which a plurality of unit cathodes and a plurality of unit anodes are sequentially stacked. The stacked type electrode assembly has an advantage in that the stacked type electrode assembly can be configured to have a prismatic structure; however, the stacked type electrode assembly has disadvantages in that a process for manufacturing the stacked type electrode assembly is complicated, and, when external impact is applied to the stacked type electrode assembly, electrodes of the stacked type electrode assembly are pushed with the result that a short circuit may occur in the stacked type electrode assembly.

In order to solve the above-described problems, there has been developed an improved electrode assembly which is a combination of the jelly-roll type electrode assembly and the stacked type electrode assembly, i.e. an electrode assembly configured to have a structure in which full cells having a cathode/separator/anode structure of a predetermined unit size or bicells having a cathode (anode)/separator/anode (cathode)/separator/cathode (anode) structure of a predetermined unit size are folded using a long continuous separator film. Examples of such an electrode assembly are disclosed in Korean Patent Application Publication No. 2001-82058, No. 2001-82059, and No. 2001-82060, which have been filed in the name of the applicant of the present patent application. In the present application, the electrode assembly with the above-stated construction is referred to as a stacked/folded type electrode assembly.

A secondary battery formed to have a structure in which the stacked type electrode assembly or the stacked/folded type electrode assembly is mounted in a battery case may be configured in various forms. A representative example of the secondary battery is a lithium ion polymer battery (LiPB) using a pouch-shaped case formed of an aluminum laminate sheet.

The lithium ion polymer battery (LiPB) is configured to have a structure in which an electrode assembly manufactured by thermally welding electrodes (cathodes and anodes) and separators is impregnated with an electrolyte. Mostly, the lithium ion polymer battery is configured to have a structure in which the stacked type electrode assembly or the stacked/folded type electrode assembly is mounted in a pouch-shaped battery case formed of an aluminum laminate sheet in a sealed state. For this reason, the lithium ion polymer battery is often referred to as a pouch-shaped battery.

Generally, a device for folding an electrode assembly through a rotational motion is used to fold the stacked/folded type electrode assembly. Referring to FIG. 1, the folding device includes a web supply unit 400 formed in the shape of a roller to supply a web 200 having plate-shaped unit cells 100, 101, 102 . . . arranged at the top of a separation film at predetermined intervals and a winding jig 300 to rotate the unit cells while holding a first one of the unit cells of the web so that the unit cells are sequentially stacked in a state in which the separation film is disposed between the respective unit cells. As the winding jig 300 is rotated, the unit cells 100, 101, 102 . . . are sequentially stacked.

Since the winding jig 300 is rotated to wind the plate-shaped unit cells 100, 101, 102 . . . , however, tension of the web 200 may be changed. The change in tension of the web 200 badly affects overall process before the web 200 is supplied to the winding device. In order for the winding device to uniformly maintain tension of the web 200, therefore, a method of compensating for the position of the winding jig 300 in an advancing direction of the web 200, i.e. in an X-axis direction, may be considered.

In connection with this matter, referring to FIG. 2, on the assumption that the turning radius of the winding jig is a, the distance from the roller to the center of rotation of the winding jig is b, and the length of the web from the roller based on an angle of the winding jig is c, c may be represented by the following equation based on the change of an angle θ of the winding jig with respect to an X axis.

$$c = (a^2 + b^2 - 2ab \cos \theta)^{1/2}$$

FIG. 3 is a graph showing a change amount of the c value based on the angle θ and a length change amount (linear change amount) of the web in a linear case. In FIG. 3, since the angle θ is rotated at uniform velocity, angular velocity is uniform, and therefore, the graph may be identical to a time-displacement graph. Consequently, the linear change amount indicates uniform velocity as a straight line having a uniform inclination.

The rotational motion of the plate-shaped structure is not changed into a linear change amount. Consequently, it is necessary to perform compensation based on the difference between the change amount of the c value based on the angle θ and the linear change amount. A graph of the compensation amount is also shown in FIG. 3.

In a case in which the compensation amount obtained using the above calculation method is applied to compensate for the position of the rotary shaft of the winding jig in the advancing direction of the web (X-axis direction), however, it is difficult to perform the process at predetermined rotational velocity or more.

In connection with this matter, referring to FIG. 4, the graph of the compensation amount has a problem in that differentiation is not possible at a point at which θ is 180 degrees, and jerk is excessive at the point. This problem is not serious in a general production process, which is in use. In a case in which the rotational velocity of the winding jig is increased, however, an excessive jerk is applied to the winding device with the result that it may be necessary to frequently replace components and products may be defective. Particularly, in a case in which the rotational velocity of the winding jig is increased twice or more than that in the general production process, which is in use, to improve process efficiency, more serious problems are caused.

Therefore, there is a high necessity for a technology that is capable of solving the above problems.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have developed a folding device to manufacture a stacked/folded type electrode assembly capable of periodically changing the position of a rotary shaft to compensate for the change in X-axis velocity (Vx) of a web caused during winding of plate-shaped unit cells, thereby uniformly maintaining tension of the web. In addition, the present inventors have discovered that in a case in which a stacked/folded type electrode assembly is manufactured using the folding device, no excessive load is applied to the device even if the rotational velocity of a winding jig, and process efficiency is improved. The present invention has been completed based on these findings.

Technical Solution

In accordance with one aspect of the present invention, the above and other objects can be accomplished by the provision of a folding device to manufacture a stacked/folded type electrode assembly having unit cells sequentially stacked in a state in which a separation film is disposed between the respective unit cells, the folding device including a web supply unit to supply a web having plate-shaped unit cells arranged at a top of a separation film at predetermined intervals, a winding jig to rotate the unit cells while holding a first one of the unit cells of the web so that the unit cells are sequentially stacked in a state in which the separation film is disposed between the respective unit cells, and a rotary shaft compensation unit to compensate for the position of a rotary shaft of the winding jig in an advancing direction of the web (X-axis direction), wherein the rotary shaft compensation unit periodically changes the position of the rotary shaft to compensate for the change in X-axis velocity (Vx) of the web caused during winding of the plate-shaped unit cells, thereby uniformly maintaining tension of the web.

Vx is velocity at the web supply unit. The X-axis velocity at the web supply unit must be uniform to uniformly maintain tension between the web supply unit and the winding jig.

The compensation amount described with reference to FIGS. 2 and 3 may apparently appear as a function having a period of 180 degrees. Actually, however, a point which cannot be differentiated, i.e. a point having a different inclination value, occurs around 180 degrees. A differential value of displacement is velocity, and therefore, a point at which velocity is abruptly changed occurs. As a result, acceleration is abruptly changed as shown in FIG. 4, resulting in the increase of a jerk.

This occurs since the winding jig or the unit cell does not perform a rotational motion in a cylindrical shape but in a plate shape. That is, the X-axis velocity Vx of the web generated during winding may theoretically be proportional to sin θ. Actually, however, the maximum value does not appear when θ=90 degrees but when θ=about 80 degrees. This is because the maximum value is obtained at a portion tangent to a circle performing a rotational motion.

In a case in which the winding jig is compensated for in the X-axis direction based on the theoretically calculated compensation amount, therefore, excessive load is applied to the device if the process is carried out at more than a predetermined velocity with the result that it is necessary to change the design of the rotary shaft compensation unit so that the rotary shaft compensation unit has higher torque.

On the other hand, in a case in which the theoretically calculated compensation amount is changed into a periodic function having a similar displacement value, while a point which cannot be differentiated does not occur. In addition, no excessive load is applied to the device even if the rotational velocity of the winding jig is increased, and it is possible to improve process efficiency without change of design. Referring to FIG. 5, differentiation is possible at every position of the compensation amount graph, and both the velocity and acceleration graphs are continuous. Also, the jerk does not deviate from a predetermined range.

Preferably, the unit cells are full cells or bicells.

A full cell as a unit cell is a cell having a unit structure of cathode/separator/anode. That is, a full cell is a cell having a cathode and an anode located at opposite sides thereof. The full cell may have a unit structure of cathode/separator/anode/separator/cathode/separator/anode in addition to the unit structure of cathode/separator/anode.

Also, a bicell as a unit cell is a cell having the same electrodes located at opposite sides thereof. For example, the bicell may have a unit structure of cathode/separator/anode/separator/cathode or a unit structure of anode/separator/cathode/separator/anode. In this specification, a cell having a structure of cathode/separator/anode/separator/cathode is referred to as a 'C type bicell', and a cell having a structure of anode/separator/cathode/separator/anode is referred to as an 'A type bicell'. That is, a cell having cathodes located at opposite sides thereof is referred to as a C type bicell, and a cell having anodes located at opposite sides thereof is referred to as an A type bicell.

The number of cathodes, anodes, and separators constituting a bicell is not particularly restricted so long as the bicell has the same electrodes located at opposite sides thereof.

A full cell and a bicell are manufactured by coupling a cathode and an anode in a state in which a separator is disposed between the cathode and an anode. A preferred example of such a coupling method is a thermal welding method.

In the full cell and the bicell, for example, the cathode is prepared by applying, drying, and pressing a mixture of a cathode active material, a conductive agent, and a binder to opposite major surfaces of a cathode current collector. A filler may be added to the mixture as needed.

Generally, the cathode current collector has a thickness of 3 to 500 µm. The cathode current collector is not particularly restricted so long as the cathode current collector exhibits high conductivity while the cathode current collector does not induce any chemical change in the battery to which it is applied. For example, the cathode current collector may be made of stainless steel, aluminum, nickel, titanium or plastic carbon. Alternatively, the cathode current collector may be made of aluminum or stainless steel the surface of which is treated with carbon, nickel, titanium, or silver. The cathode current collector may have a micro uneven pattern formed at the surface thereof so as to increase adhesive strength of the cathode active material. The cathode current collector may be configured in various forms, such as a film, a sheet, a foil, a net, a porous body, a foam body, and a non-woven fabric body.

The cathode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where, x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_x$, $LiFe_3O_4$, $V_2O_5$, or $Cu_2V_2O_7$; an Ni-sited lithium nickel oxide represented by a chemical formula $LiNi_{1-x}M_xO_2$ (where, M=Co, Mn, Al, Cu, Fe, Mg, B, or Ga, and x=0.01 to 0.3); a lithium manganese composite oxide represented by a chemical formula $LiMn_{2-x}M_xO_2$ (where, M=Co, Ni, Fe, Cr, Zn, or Ta, and x=0.01 to 0.1) or a chemical formula $Li_2Mn_3MO_x$ (where, M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 50% by weight based on the total weight of the compound including the cathode active material. The conductive agent is not particularly restricted so long as the conductive agent exhibits high conductivity while the conductive agent does not induce any chemical change in the battery to which it is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 50% by weight based on the total weight of the compound including the cathode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the cathode. There is no particular limit to the filler so long as it does not cause chemical changes in the battery to which it is applied and is made of a fibrous material. As examples of the filler, there may be used olefin polymers, such as polyethylene and polypropylene; and fibrous materials, such as glass fiber and carbon fiber.

On the other hand, the anode is prepared by applying, drying and pressing an anode active material to an anode current collector. The conductive agent, the binder and the filler, which were previously described, may be selectively added to the anode active material as needed.

Generally, the anode current collector has a thickness of 3 to 500 µm. The anode current collector is not particularly restricted so long as the anode current collector exhibits high conductivity while the anode current collector does not induce chemical changes in the battery to which it is applied. For example, the anode current collector may be made of copper, stainless steel, aluminum, nickel, titanium, or plastic carbon. Alternatively, the anode current collector may be made of copper or stainless steel the surface of which is treated with carbon, nickel, titanium, or silver or an aluminum-cadmium alloy. In the same manner as in the cathode current collector, the anode current collector may have a micro uneven pattern formed at the surface thereof so as to increase adhesive strength of the anode active material. The anode current collector may be configured in various forms, such as a film, a sheet, a foil, a net, a porous body, a foam body, and a non-woven fabric body.

As the anode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is disposed between the cathode and the anode. As the separator, for example, an insulative thin film exhibiting high ion permeability and high mechanical strength may be used. The separator generally has a pore diameter of 0.01 to 10 µm and a thickness of 5 to 300 µm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may function as a separator. The separation film used in the present invention may be formed of the same material as the separator or a material different from the separator.

The unit cells may be disposed on the separation film so that a first unit cell and a second unit cell are spaced apart from each other by a distance corresponding to at least one unit cell, and the distance between the unit cells after the second unit cell is gradually increased.

The reason that the first unit cell and the second unit cell are spaced apart from each other is that the electrodes of the first unit cell face those of another unit cell in a state in which the outer surface of the first unit cell is fully wrapped with the separation film through one time of winding, thereby preventing the occurrence of a short circuit due to contact between the electrodes.

When the stacked/folded type electrode assembly is manufactured, electrodes at the stacked surfaces must be different from each other. In order to configure an electrochemical cell including secondary batteries using a plurality of full cells, the full cells must be stacked in a state in which a separation film is disposed between the respective full cells so that cathodes and anodes of the full cells face each other. In order to configure an electrochemical cell including secondary batteries using a plurality of bicells, a plurality of C type bicells and a plurality of A type bicells must be stacked in a state in which a separation film is disposed between the respective full cells so that cathodes and anodes of the bicells face each other.

In a case in which the unit cells are full cells, as shown in FIG. 6, the full cells may be disposed on the separation film so that the same electrodes of the first full cell 110 and the second full cell 111 face upward, and different electrodes of the full cells after the second full cell sequentially face upward. For example, in a case in which a positive (+) electrode of the first full cell 110 faces upward, a positive (+) electrode of the second full cell 111 may face upward, and a negative (−) electrode of the third full cell 112 may face upward. Subsequently, positive (+) electrodes and negative (−) electrodes of the full cells may be sequentially arranged.

In a case in which the unit cells are bicells, as shown in FIG. 7, the bicells may be disposed on the separation film so that the first bicell 120 and the second bicell 121 are different types of cells, and the cells after the second bicell are arranged in a pair of same type cells. For example, in a case in which the first bicell 120 is a C type bicell, the second and third bicells 121 and 122 may be A type bicells, and the fourth and fifth bicells 123 and 124 may be C type bicells. Subsequently, the bicells may be sequentially arranged in a pair of same type cells.

The shape of the winding jig is not particularly restricted so long as the winding jig is configured to wind the web. For example, the winding jig may be configured to fixedly hold the web at the upper end of one of the unit cells and the lower end of the separation film corresponding to one of the unit cells.

The winding jig winds the web in a state in which the winding jig simultaneously holds the unit cells and the separation film. Consequently, the unit cells are stacked in a state in which the separation film is disposed between the respective unit cells.

In the folding device according to the present invention, the compensation amount of the rotary shaft based on the angle θ may be changed at a period of a sine function.

A periodic function having a displacement value most similar to that of the compensation amount graph based on theoretical calculation is a sine function. The displacement value of the sine function may be changed according to values of variables, such as a, b, and c, in calculating the compensation amount of the folding device, and a sine function having a displacement value similar to the calculated compensation amount may be found and used.

In the folding device according to the present invention, the winding jig may have a rotational velocity of 20 to 200 rpm.

It is possible to secure the rotational velocity as described above without change of the device, thereby improving process efficiency based on the increase of the rotational velocity.

The rotary shaft compensation unit of the winding jig may be used so long as compensation is performed using a periodic function. Preferably, the rotary shaft compensation unit is configured to have an interconnected variable rotation structure to prevent separation of the rotary shaft compensation unit which may occur when the winding velocity is increased. A preferred example of the variable rotation structure may include a rotary eccentric roller and a variable crank to convert a rotational motion of the eccentric roller into a rectilinear motion.

In accordance with another aspect of the present invention, there is provided a stacked-folded type electrode assembly manufactured using the folding device with the above-stated construction. Also, a lithium secondary battery including the electrode assembly and a lithium salt-containing, non-aqueous electrolyte is provided.

The lithium salt-containing, non-aqueous electrolyte is composed of a non-aqueous electrolyte and lithium. As the non-aqueous electrolyte, a non-aqueous electrolytic solution, solid electrolyte, or inorganic solid electrolyte may be used.

As examples of the non-aqueous electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides and sulphates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

Additionally, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. According to circumstances, in order to impart incombustibility, the electrolyte may further include halogen-containing solvents, such as carbon tetrachloride and ethylene trifluoride. Furthermore, in order to improve high-temperature storage characteristics, the electrolyte may additionally include carbon dioxide gas. In addition, fluoroethylene carbonate (FEC) and propene sultone (PRS) may be further included.

The secondary battery according to the present invention may be used as a battery cell used as a power source of a small-sized device. In addition, the secondary battery according to the present invention may be used as a unit cell of a middle or large-sized battery module including a plurality of battery cells used as a power source of a middle or large-sized device.

A preferred example of the middle or large-sized device may be, but is not limited to, a power tool, which is operated by an electric motor, an electric four-wheeled vehicle, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), or an electric golf cart.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 5:
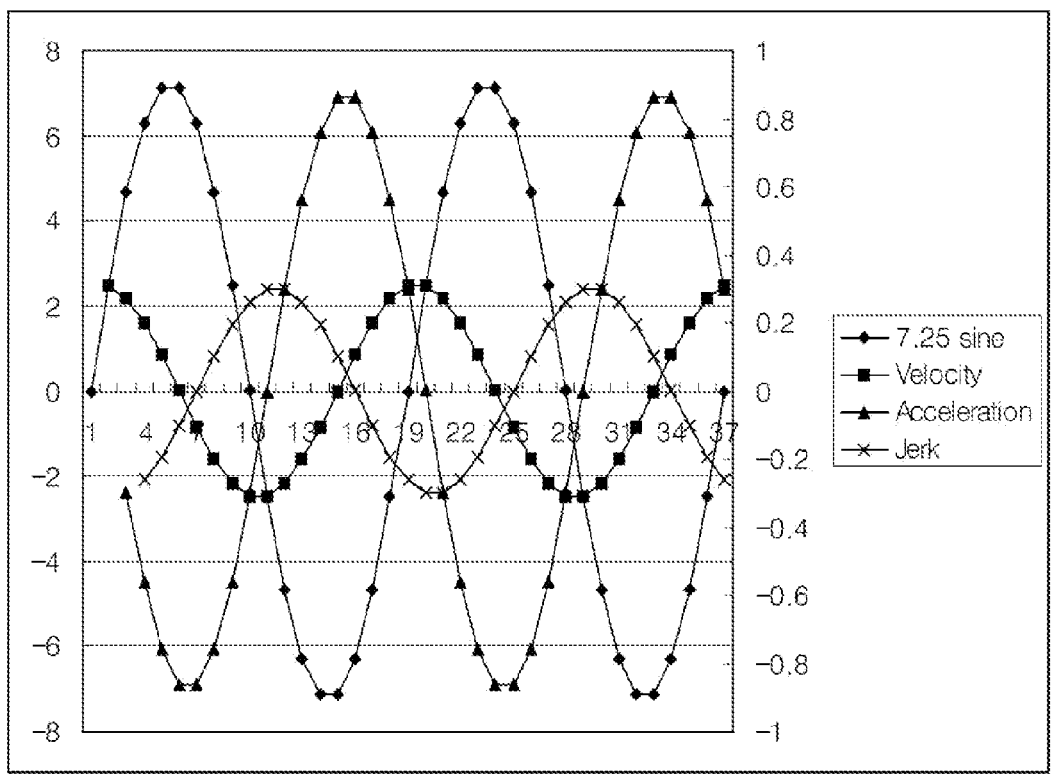
FIG. 5 is a graph showing the compensation amount, the velocity, the acceleration, and the jerk based on the rotational angle θ in a case in which compensation is performed using a periodic function.

FIG. 5 is a graph showing the compensation amount, the velocity, the acceleration, and the jerk based on the rotational angle θ in a case in which compensation is performed using a periodic function (7.25 sine function) according to an embodiment of the present invention.

In connection with this matter, a description will be given with reference to FIGS. 2 to 4 for comparison with FIG. 5.

Figure 1:
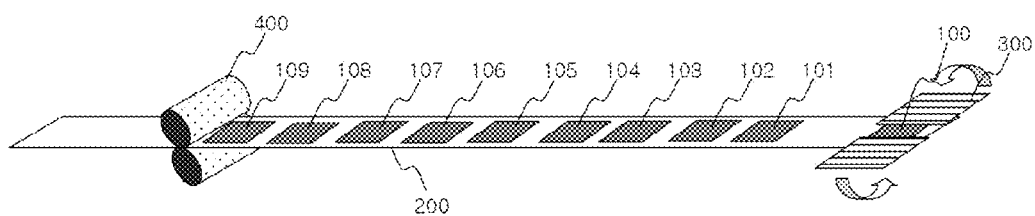
FIG. 1 is a typical view schematically showing a folding device to manufacture a stacked/folded type electrode assembly.
Figure 2:
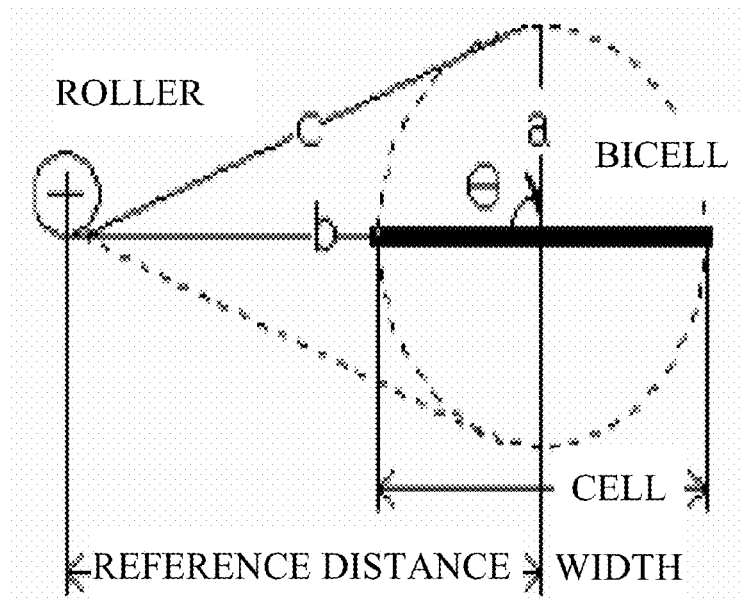
FIG. 2 is a view showing calculation of change in length of a web due to a rotational motion of a winding jig.

Referring to FIG. 2, the length c of a web from the roller based on an angle of the winding jig may be represented by $c=(a^2+b^2-2ab\cos\theta)^{1/2}$ based on the change of an angle θ of the winding jig with respect to an X axis, and $c_0$ when θ=0 may be subtracted from c to calculate a length change amount of the web.

Figure 3:
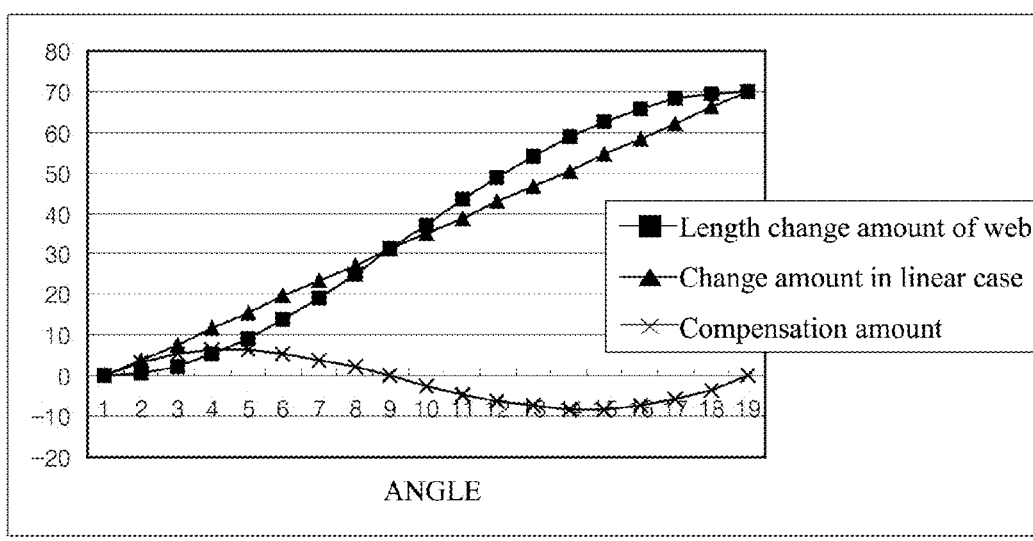
FIG. 3 is a graph showing a length change amount of a web during a rotational motion, the length change amount of the web in a linear case, and a compensation amount of the web based on a rotational angle θ.

Consequently, the length change amount of the web may deviate as shown in FIG. 3 as compared with the linear change amount in which the length of the web is uniformly increased according to the rotational angle. For this reason, a method of eliminating such deviation through compensation in an X-axis direction may be considered. In the relationship among the compensation amount, the velocity, the acceleration, and the jerk based on the rotational angle θ as shown in FIG. 4, however, a point which cannot be differentiated occurs around 180 degrees. As a result, acceleration is abruptly changed, resulting in an excessive jerk.

Figure 4:
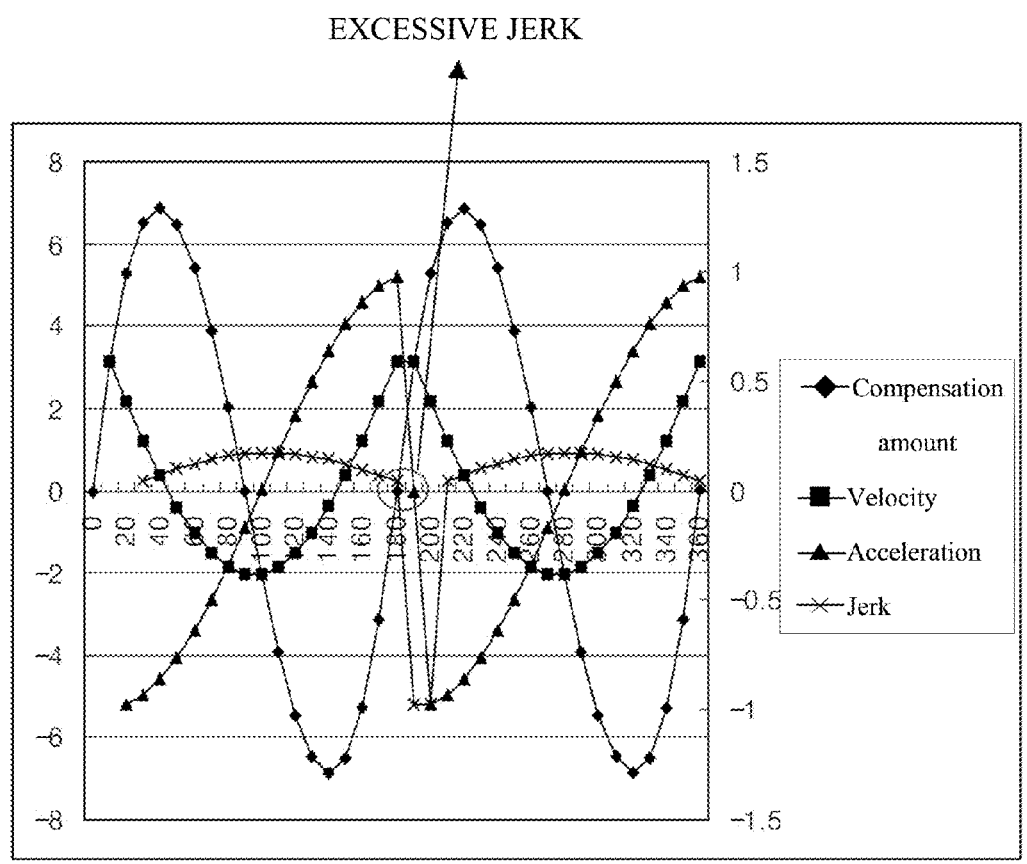
FIG. 4 is a graph showing the compensation amount, velocity, acceleration, and a jerk based on the rotational angle θ.

In the graph of FIG. 5, on the other hand, a point which cannot be differentiated as shown in FIG. 4 does not occur.

The compensation amount graph calculated in FIG. 3 is similar to a periodic function graph, i.e. a sine function graph. When a sine function graph similar to the calculated compensation amount graph of the folding device is properly selected for compensation, therefore, differentiation is possible at every position of the compensation amount graph, and both the velocity and acceleration graphs are continuous, as shown in FIG. 5. Also, the jerk does not deviate from a predetermined range, and therefore, it is not necessary to compensate for torque due to the excessive jerk.

Figure 6:
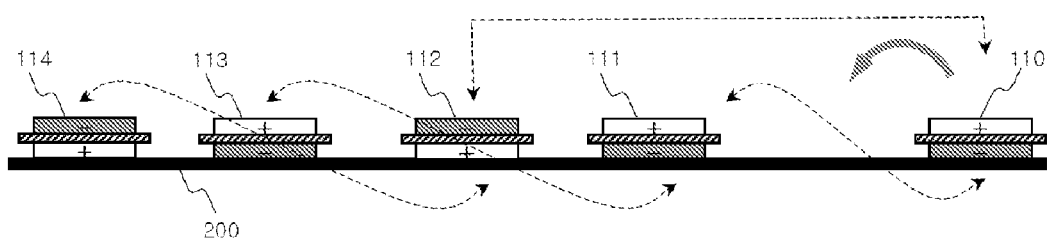
FIG. 6 is a typical view showing an arrangement type in a case in which unit cells are full cells.

FIG. 6 is a typical view showing an arrangement type in a case in which unit cells are full cells according to an embodiment of the present invention.

Referring to FIG. 6, a stacked/folded type electrode assembly may be manufactured by arranging full cells 110, 111, 112, 113, and 114, each of which has a cathode/separator/anode sequentially disposed, as unit cells, on a separation film 200 and sequentially winding the full cells 110, 111, 112, 113, and 114 from the first pull cell 110.

In arrangement of the full cells 110, 111, 112, 113, and 114, the first full cell 110 and the second full cell 111 are spaced apart from each other by a distance corresponding to at least one full cell. During winding, therefore, the outer surface of the first full cell 110 is fully wrapped by the separation film 200, and then a lower end electrode (anode) of the first full cell 110 comes into contact with an upper end electrode (cathode) of the second full cell 111.

The length of the separation film 200 to wrap the full cells 112, 113, and 114 after the second full cell 111 is increased during sequential stacking performed by winding. For this reason, the full cells are disposed so that the distance therebetween is sequentially increased in the winding direction.

Also, the full cells 110, 111, 112, 113, and 114 are configured so that cathodes and anodes face each other at the interface between the stacked full cells during winding. In a preferred example, therefore, the first full cell 110 and the second full cell 111 are full cells each having a cathode as an upper end electrode, the third full cell 112 is a full cell having an anode as an upper end electrode, the fourth full cell 113 is a full cell having a cathode as an upper end electrode, and the fifth full cell 114 is a full cell having an anode as an upper end electrode. That is, the full cells 111 and 113, each of which having a cathode as an upper end electrode, and the full cells 112 and 114, each of which having an anode as an upper end electrode, are alternately arranged except for the first full cell 110.

Figure 7:
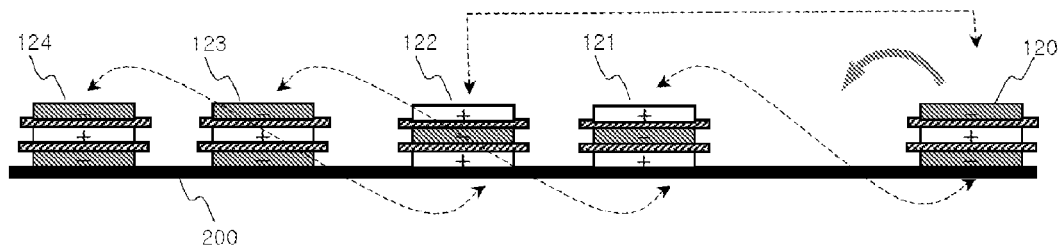
FIG. 7 is a typical view showing an arrangement type in a case in which unit cells are bicells.

FIG. 7 is a typical view showing an arrangement type in a case in which unit cells are bicells according to another embodiment of the present invention.

Referring to FIG. 7, bicells 120, 121, 122, 123, and 124, each of which has a cathode/separator/anode/separator/cathode or anode/separator/cathode/separator/anode sequentially disposed, as unit cells, are disposed on a separation film 200, and the bicells 120, 121, 122, 123, and 124 are sequentially wound from the first bicell 120 to manufacture a stacked/folded type electrode assembly.

In arrangement of the bicells 120, 121, 122, 123, and 124 as unit cells, the first bicell 120 and the second bicell 121 are spaced apart from each other by a distance corresponding to at least one bicell. During winding, therefore, the outer surface of the first bicell 120 is fully wrapped by the separation film 200, and then a lower end electrode (anode) of the first bicell 120 comes into contact with an upper end electrode (cathode) of the second bicell 121.

The length of the separation film 200 to wrap the bicells 122, 123, and 124 after the second bicell 121 is increased during sequential stacking performed by winding. For this reason, the bicells are disposed so that the distance therebetween is sequentially increased in the winding direction.

Also, the bicells 120, 121, 122, 123, and 124 are configured so that cathodes and anodes face each other at the interface between the stacked bicells during winding. In a preferred example, the first bicell 120 has an anode as an external electrode, the second bicell 121 and the third bicell 122 have a cathode as an external electrode, and the fourth bicell 123 and the fifth bicell 124 have an anode as an external electrode. That is, the bicells 121 and 122 having a cathode as an external electrode and the bicells 123 and 124 having an anode as an external electrode are alternately arranged every two bicells except for the first bicell 120.

Figure 8:
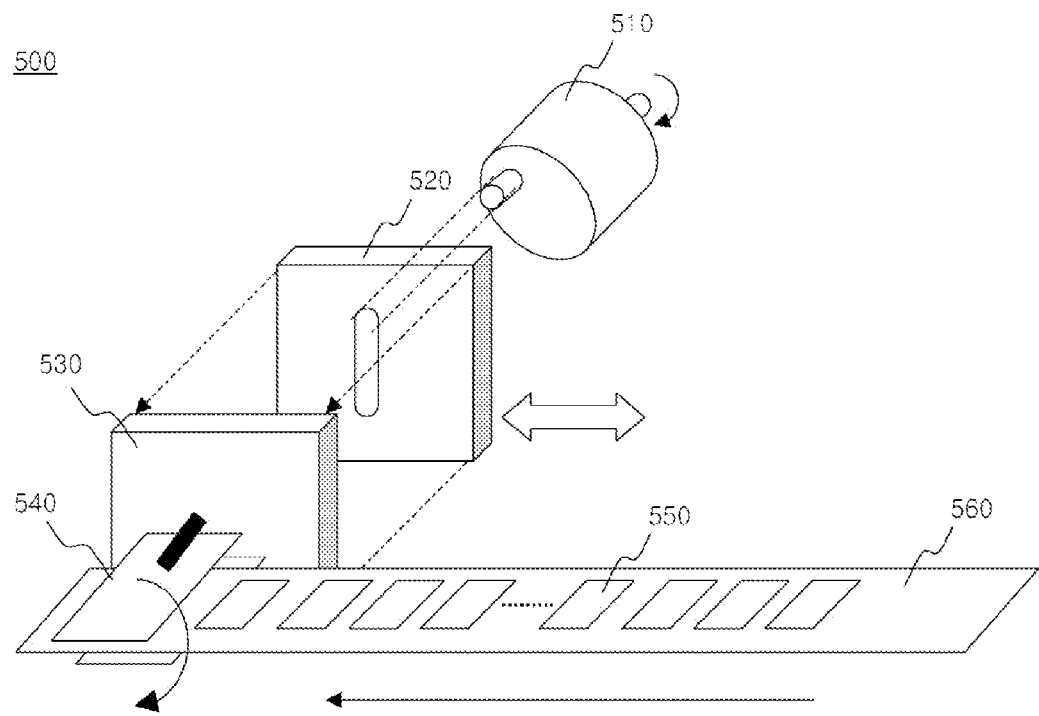
FIG. 8 is a schematic typical view showing a folding device according to an embodiment of the present invention.

FIG. 8 is a schematic typical view showing a folding device according to an embodiment of the present invention.

Referring to FIG. 8, a folding device 500 includes a rotary shaft compensation unit and a winding unit. The rotary shaft compensation unit is configured to have an interconnected variable rotation structure. The rotary shaft compensation unit includes a rotary eccentric roller 510 and a variable crank 520 to convert a rotational motion of the eccentric roller 510 into a rectilinear motion.

At a portion of the variable crank 520 with which an eccentric shaft of the eccentric roller 510 engages is formed a groove extending in the vertical direction by a rotational diameter of the eccentric shaft. Although not shown, the variable crank 520 is configured so that the movement of the variable crank 520 in the vertical direction is restrained.

Consequently, the rotational motion transmitted through the eccentric roller 510 does not move the variable crank 520 in the vertical direction but is converted into a horizontal rectilinear motion through the groove. This rectilinear motion is performed by rotation of the eccentric shaft of the eccentric roller 510. Consequently, the rectilinear motion is performed in the form of a periodic function.

The variable crank 520 of the rotary shaft compensation unit is operatively connected to the winding unit 530 having a winding jig 540 mounted thereto to compensate for a rotary shaft of the winding jig 540 in the advancing direction of the web.

In this case, feeding velocity of a web having unit cells 550 arranged on a separation film 560 during winding the web using the winding jig 540 is uniformly maintained. Also, in a case in which the variable crank is used as described above, it is possible to prevent separation of the folding device which may occur when the variable crank is moved at high velocity.

INDUSTRIAL APPLICABILITY

As is apparent from the above description, a folding device to manufacture a stacked/folded type electrode assembly according to the present invention is configured so that rotational velocity of the folding device can be increased without change of a conventional device, thereby improving process efficiency.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A folding device to manufacture a stacked/folded type electrode assembly having unit cells sequentially stacked in a state in which a separation film is disposed between the respective unit cells, the folding device comprising:
    a web supply unit to supply a web having plate-shaped unit cells arranged at a top of the separation film at predetermined intervals;
    a winding jig in direct contact with a first of the unit cells during formation of the stacked assembly whereby the winding jig rotates the unit cells while holding a first one of the unit cells of the web so that the unit cells are sequentially stacked in a state in which the separation film is disposed between the respective unit cells; and
    a rotary shaft compensation unit to compensate for a position of a rotary shaft of the winding jig in an advancing direction of the web, wherein
    the rotary shaft compensation unit changes the position of the rotary shaft at a period of a sine function to compensate for the change in a velocity of the web in the advancing direction of the web caused during winding of the plate-shaped unit cells, thereby uniformly maintaining tension of the web,
    the rotary shaft compensation unit is configured to have an interconnected variable rotation structure,
    the rotary shaft compensation unit includes a rotary eccentric roller and a variable crank to convert a rotational motion of the eccentric roller into a rectilinear motion,
    at a portion of the variable crank with which an eccentric shaft of the eccentric roller engages is formed a groove extending in a vertical direction by a rotational diameter of the eccentric shaft,
    the variable crank is configured so that the movement of the variable crank in the vertical direction is restrained, and
    the variable crank of the rotary shaft compensation unit is operatively connected to a winding unit having the winding jig mounted thereto to compensate for the rotary shaft of the winding jig in the advancing direction of the web.

2. The folding device according to claim 1, wherein the unit cells are full cells or bicells.

3. The folding device according to claim 1, wherein the unit cells are disposed on the separation film so that a first unit cell and a second unit cell are spaced apart from each other by a distance corresponding to at least one unit cell, and the distance between the unit cells after the second unit cell is gradually increased.

4. The folding device according to claim 3, wherein, in a case in which the unit cells are full cells, the full cells are disposed on the separation film so that a first electrode of a first full cell and a first electrode of a second full cell face upward, the first electrode of the first full cell and the first electrode of the second cell being the same type of electrode and full cells after the second full cell are arranged such that different types of electrode sequentially face upward in an alternating manner.

5. The folding device according to claim 3, wherein, in a case in which the unit cells are bicells, the bicells are disposed on the separation film so that a first bicell and a second bicell are different types of cells, and the cells after the second bicell are arranged in a pair of same type cells.

6. The folding device according to claim 1, wherein the winding jig is configured to fixedly hold the web at an upper end of one of the unit cells and a lower end of the separation film corresponding to the one of the unit cells.

7. The folding device according to claim 1, wherein the winding jig has a rotational velocity of 20 to 200 rpm.

* * * * *